United States Patent
Hyer et al.

(10) Patent No.: US 9,024,212 B2
(45) Date of Patent: May 5, 2015

(54) LOAD SENSING SYSTEM WITH FLEXURE PLATE

(71) Applicant: Hyer Industries, Inc., Pembroke, MA (US)

(72) Inventors: Frank S. Hyer, Duxbury, MA (US); John E. Duffy, Carver, MA (US)

(73) Assignee: Hyer Industries, Inc.

( * ) Notice: Subject to any disclaimer, the term of this patent is extended or adjusted under 35 U.S.C. 154(b) by 266 days.

(21) Appl. No.: 13/891,145

(22) Filed: May 9, 2013

(65) Prior Publication Data

US 2014/0332288 A1     Nov. 13, 2014

(51) Int. Cl.
    *G01G 11/00*      (2006.01)
    *G01G 3/12*      (2006.01)

(52) U.S. Cl.
    CPC .............. *G01G 11/003* (2013.01); *G01G 3/12* (2013.01)

(58) Field of Classification Search
    CPC .. G01G 3/12; G01G 3/13; G01G 3/14–3/147; G01G 3/18; G01G 11/00–11/20; Y10S 177/09
    See application file for complete search history.

(56) References Cited

U.S. PATENT DOCUMENTS

| | | | | |
|---|---|---|---|---|
| 3,163,248 A | * | 12/1964 | Farquhar | 177/132 |
| 3,512,595 A | * | 5/1970 | Laimins | 177/187 |
| 3,785,447 A | * | 1/1974 | Blackerby | 177/119 |
| 4,260,034 A | * | 4/1981 | Randolph, Jr. | 177/211 |
| 4,361,199 A | * | 11/1982 | Ulicny | 177/154 |
| 4,580,645 A | * | 4/1986 | Shoberg | 177/211 |
| 4,682,664 A | * | 7/1987 | Kemp | 177/16 |
| 5,111,896 A | * | 5/1992 | Porcari et al. | 177/16 |
| 5,294,756 A | * | 3/1994 | Lauber et al. | 177/119 |
| 5,296,654 A | * | 3/1994 | Farley et al. | 177/145 |
| 5,337,618 A | | 8/1994 | Porcari et al. | |
| 5,338,901 A | * | 8/1994 | Dietrich | 177/16 |
| 5,388,901 A | | 2/1995 | Asano | |
| 5,497,659 A | * | 3/1996 | Roder | 73/159 |
| 7,331,210 B2 | * | 2/2008 | Dietrich | 73/1.13 |
| 2003/0136589 A1 | * | 7/2003 | Dietrich | 177/16 |
| 2007/0215391 A1 | * | 9/2007 | Wineland | 177/1 |
| 2012/0111644 A1 | * | 5/2012 | Li | 177/52 |

\* cited by examiner

*Primary Examiner* — Peter Macchiarolo
*Assistant Examiner* — Natalie Huls
(74) *Attorney, Agent, or Firm* — Douglas Denninger

(57) ABSTRACT

A load sensing system having at least one load sensing assembly, each assembly including a flexure plate with an upper region extending along a longitudinal length of the flexure plate, a lower region disposed below the upper region, and at least one flex region disposed between the upper region and the lower region. The lower region defines a mounting feature for an end of a weigh idler and is capable of substantially only lateral movement relative to the upper region. Each assembly further includes a load cell and a bracket having a first end rigidly connected to a force transmission surface of the load cell and having a second end rigidly connected at a plurality of areas to the upper region of the flexure plate to rigidly capture the upper region while suspending the remainder of the flexure plate.

19 Claims, 7 Drawing Sheets

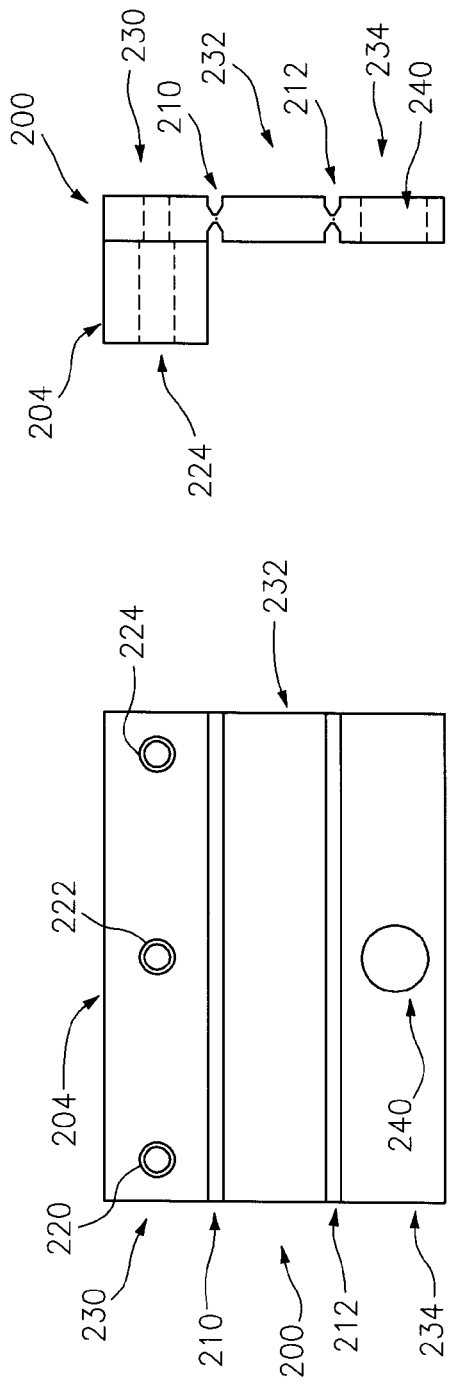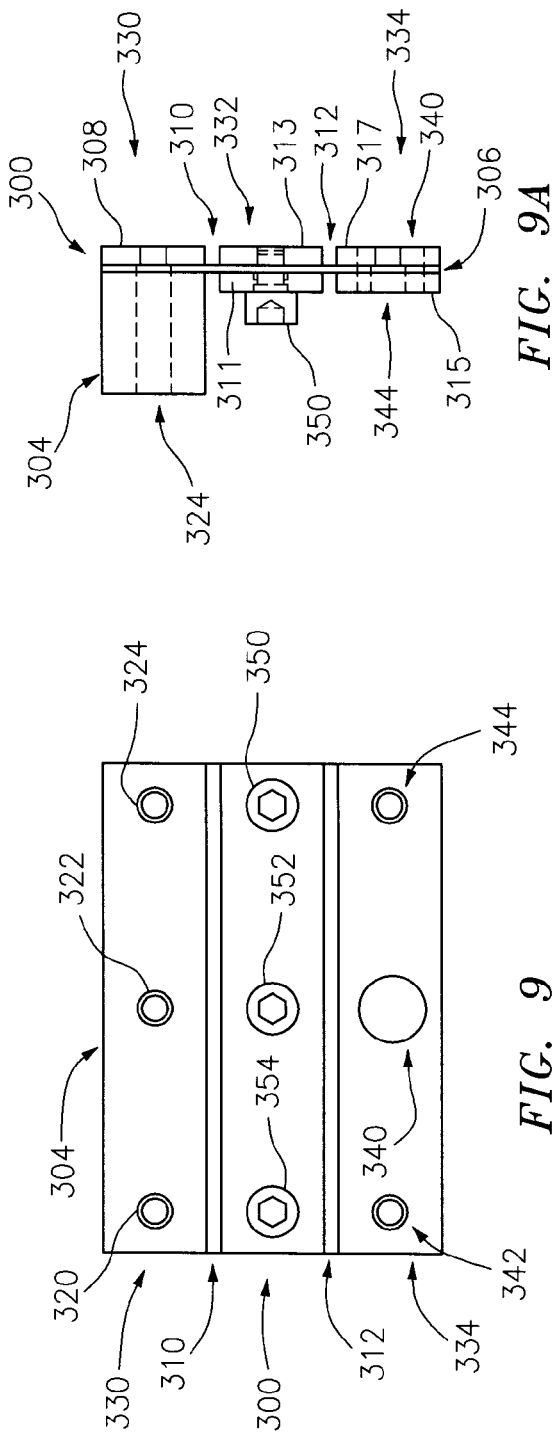

LOAD SENSING SYSTEM WITH FLEXURE PLATE

FIELD OF THE INVENTION

The invention relates to load sensing systems for conveyor weigh scales.

BACKGROUND OF THE INVENTION

There are many industries that utilize conveyor belts to transport raw materials and components as well as finished goods during various manufacturing and handling processes. Often it is helpful to quantify by weight the materials conveyed on the belts.

Load sensing assemblies for measuring weight of loads on a conveyor must contend with both vertical and horizontal directional force components. Certain cantilevered parallel beam load cells are described by Kemp in U.S. Pat. No. 4,682,664, for example, connected to belt supports such as weigh idlers. These load cells are most commonly referred to in the trade as "Single Point" load cells. Other names include "Parallelogram" load cells, "Platform" load cells, "Cantilevered Dual Parallel Beam" load cells and "Cantilevered Triple Parallel Beam" load cells. Such load cells are available in a wide range of capacities starting as low as one or two kg for low-density loads, and generally exhibit exceptional insensitivity to moments created by "off-center" placement of loads. They also have high structural robustness to lateral forces, particularly if they are applied in the same direction as the direction of the cantilevered beams. The parallelogram structure created by at least two cantelevered parallel beams responds to deflection in a manner similar to that of a parallelogram linkage such that the load receiving column moves parallel to the support bearing column, thereby minimizing any tilting of the weigh idler in the direction of the movement of the belt.

Single point load cells when used to support a single, typically planar weigh platform or deck exhibit a high degree of insensitivity to the positioning of a vertical load anywhere upon it. However, if the weigh platform is coupled externally to any other structure which impedes the normal linear and angular deflections that would occur due to the moments generated by off-center loading, the effectiveness of the built-in compensation may be seriously compromised, especially when attempting to measure light loads. Rigidly securing the ends of a weigh idler shaft to two such load cells creates this particular problem. Additionally, horizontal forces, especially drag, produced by the moving belt over the weigh idler create moments about the shaft which likewise compromise the effectiveness of the built-in compensation.

A suspension-type strain gauge transducer structure for platform scales is disclosed by Laimins in U.S. Pat. No. 3,512,595. Wire-type coupling elements or box-beam members are disposed at one or more locations about the platform.

It is therefore desirable to have a load sensing system which is more sensitive to light loads on conveyor belts such as encountered in the snack food and cereal industries.

SUMMARY OF THE INVENTION

An object of the present invention is to provide an improved load sensing system with increased accuracy, particularly for light loads passing along a conveyor belt.

This invention features a load sensing system having at least one load sensing assembly, each assembly including a flexure plate with an upper region extending along a longitudinal length of the flexure plate, a lower region disposed below the upper region, and at least one flex region disposed between the upper region and the lower region. The lower region defines a mounting feature for an end of a weigh idler and is capable of substantially only lateral movement relative to the upper region. Each assembly further includes a load cell having a support surface and a force transmission surface, and a bracket having a first end rigidly connected to the force transmission surface of the load cell. The bracket also has a second end rigidly connected at a plurality of areas to the upper region of the flexure plate to rigidly capture the upper region while suspending the remainder of the flexure plate to enable substantially only lateral movement of the lower region of the flexure plate during deflection of the flex region.

In some embodiments, the flexure plate includes a substantially planar sheet of material, such as a metal alloy, having spring-like resiliency in at least the at least one flex region. In certain embodiments, the lower region of the flexure plate includes a substantially rigid stiffener, such as one or more bar members, extending longitudinally along the lower region. In some embodiments, the mounting feature is defined at least in part by a portion of the stiffener.

In a number of embodiments, the load cell is a single point-type load cell. In some embodiments, the weigh idler includes a shaft having first and second ends, with one of the first and second ends connected to the mounting feature of the flexure plate. In certain embodiments, the weigh idler is freely rotatable about the shaft.

This invention may also be expressed as a method of weighing objects on a conveyor belt, including selecting a weigh idler including a shaft having first and second ends, and selecting first and second load sensing assemblies, each load sensing assembly including: (1) a flexure plate having an upper region extending along a longitudinal length of the flexure plate, a lower region disposed below the upper region, and at least one flex region disposed between the upper region and the lower region, the lower region defining a mounting feature for one of the first and second ends of the weigh idler, the lower region capable of substantially only lateral movement relative to the upper region, (2) a load cell having a support surface and a force transmission surface; and (3) a bracket having a first end rigidly connected to the force transmission surface of the load cell and having a second end rigidly connected at a plurality of areas to the upper region of the flexure plate to rigidly capture the upper region while suspending the remainder of the flexure plate to enable substantially only lateral movement of the lower region of the flexure plate during deflection of the flex region. The method further includes supporting the weigh idler entirely by the flexure plates of the first and second load sensing assemblies, and sensing the weight of objects on a conveyor belt passing over the weigh idler.

BRIEF DESCRIPTION OF THE DRAWINGS

In what follows, preferred embodiments of the invention are explained in more detail with reference to the drawings, in which:

FIGS. 8 and 8A are side and end views of an alternative flexure plate; and

FIGS. 9 and 9A are views similar to FIGS. 8 and 8A of yet another flexure plate according to the present invention.

DETAILED DESCRIPTION OF THE PRESENTLY PREFERRED EMBODIMENTS

This invention may be accomplished by a load sensing system having at least one load sensing assembly, each assembly including a flexure plate with an upper region extending along a longitudinal length of the flexure plate, a lower region disposed below the upper region, and at least one flex region disposed between the upper region and the lower region. The lower region defines a mounting feature for an end of a weigh idler and is capable of substantially only lateral movement relative to the upper region during deflection of the flex region. The term "weigh idler" is utilized herein in its broadest meaning to include supporting structure such as shafts, struts and other bridge members associated with one or more rollers, skids or other elements which passively contact a conveyor belt without imparting a driving force to the belt. Each load sensing assembly further includes a load cell and a bracket having a first end rigidly connected to a force transmission surface of the load cell and having a second end rigidly connected at a plurality of areas to the upper region of the flexure plate to rigidly capture the upper region while suspending the remainder of the flexure plate.

Figure 1:
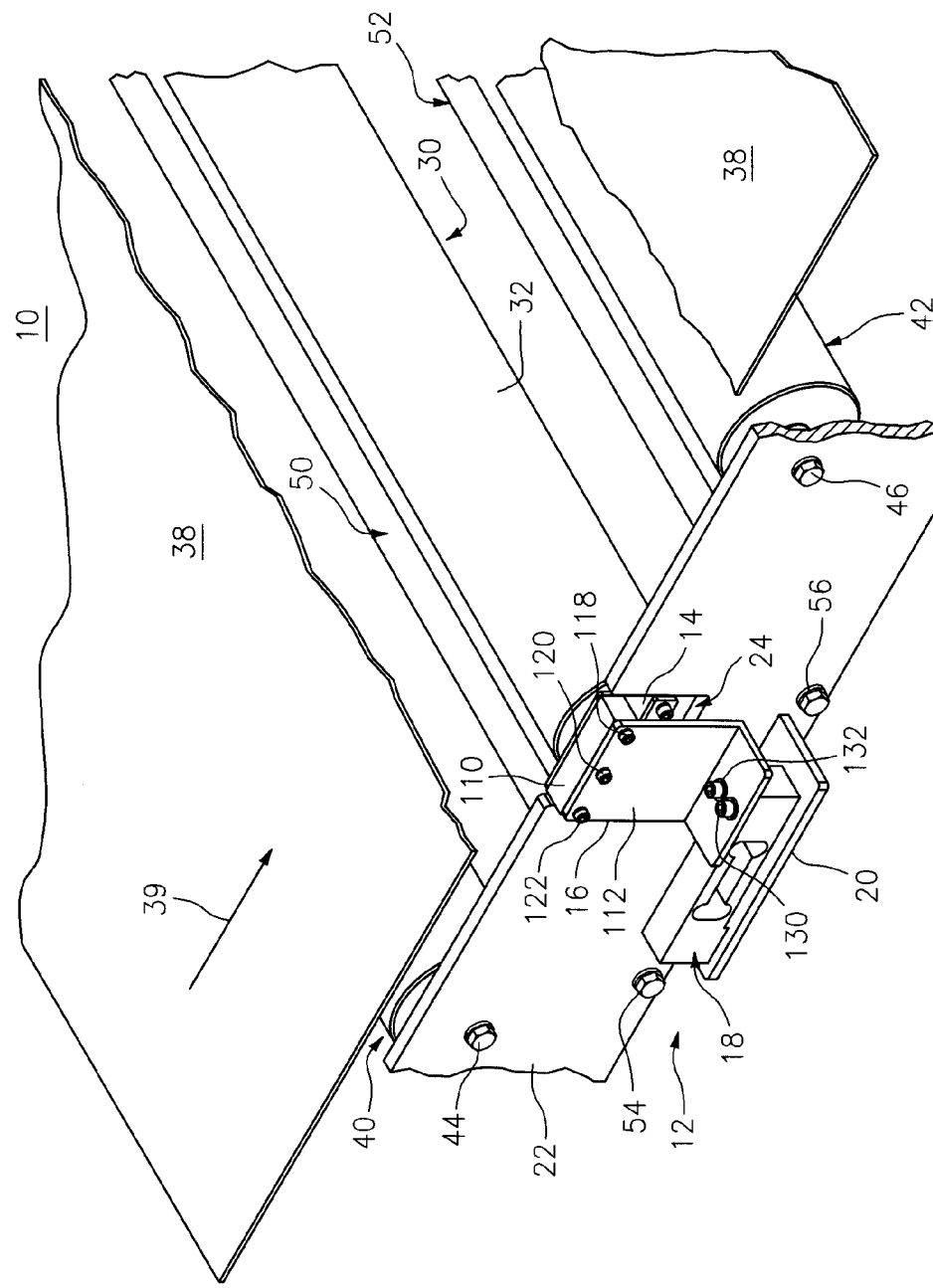
FIG. 1 is a side perspective view of a load sensing system according to the present invention having a load sensing assembly connected to a weigh idler underlying a conveyor belt shown in partial cut-away.
Figure 2:
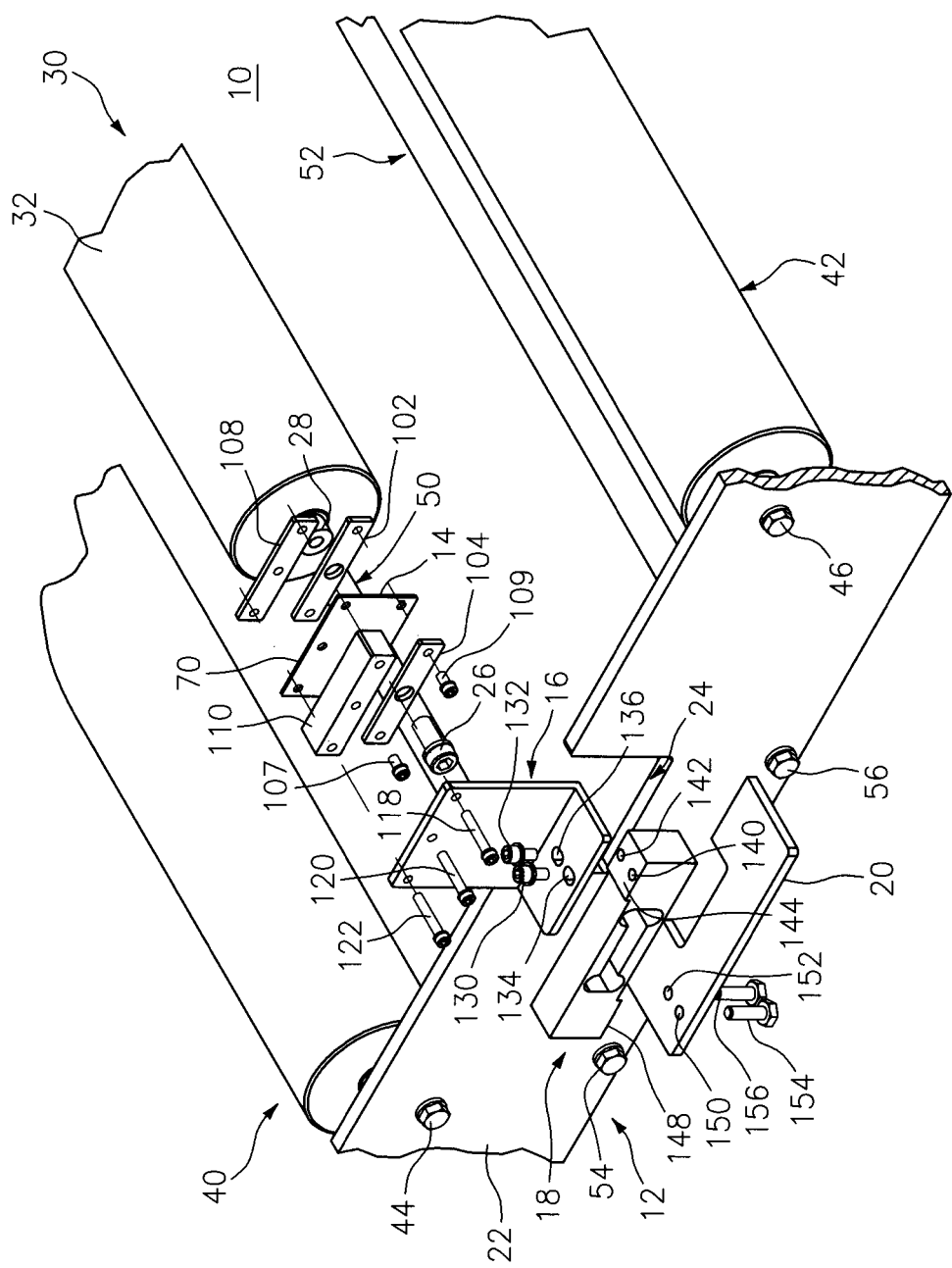
FIG. 2 is an exploded view of the load sensing system of FIG. 1.
Figure 3:
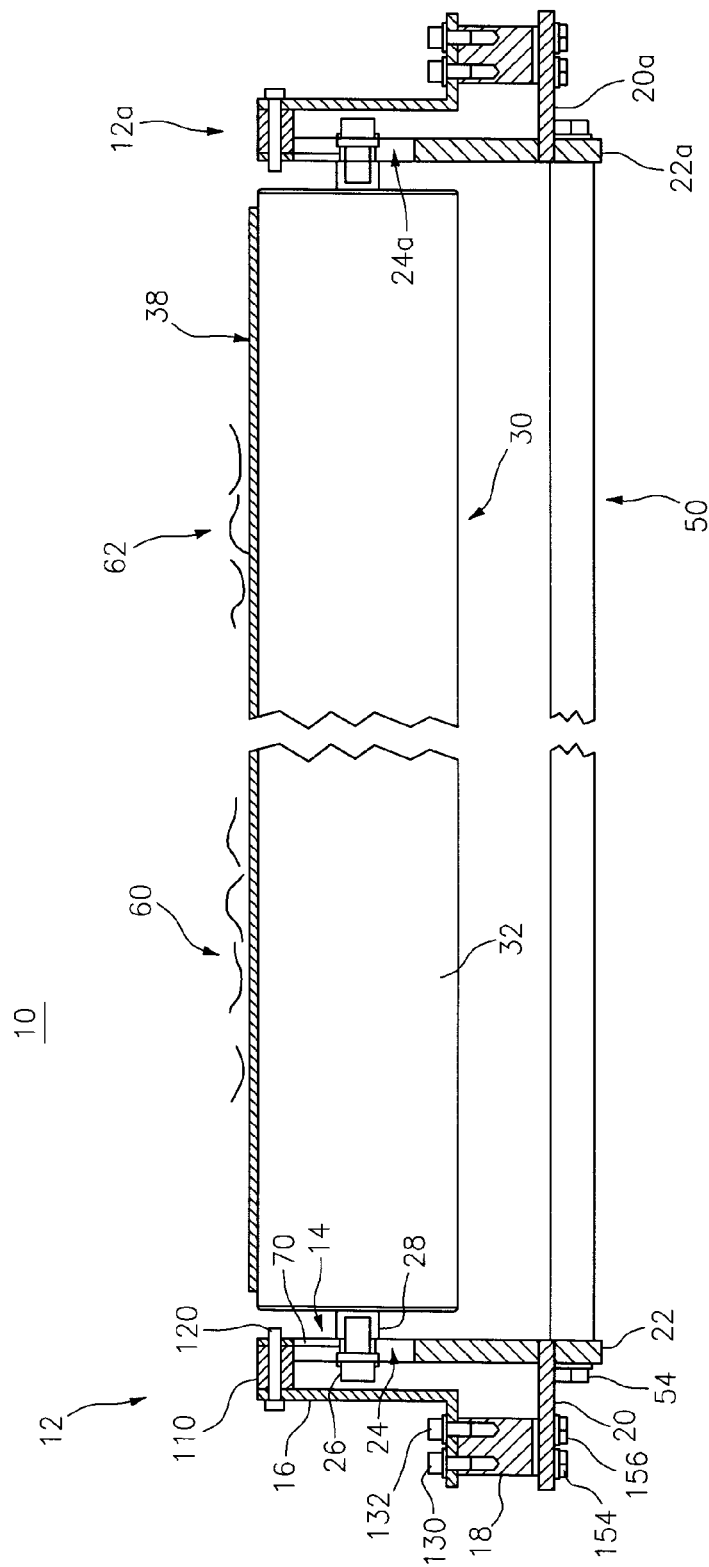
FIG. 3 is an end, partial-cross-sectional view of the system of FIG. 1 with light objects to be weighed on top of the conveyor belt.

System 10, FIGS. 1-3, has a load sensing assembly 12 with a flexure plate 14, a bracket 16, and a load cell 18 attached to a support shelf 20 rigidly secured to a side rail 22. In this construction, the opposite side of system 10, as illustrated in FIG. 3, has similar components with similar reference numerals, such as load sensing assembly 12a and side rail 22a with support shelf 20a and opening 24a. Support 20 is a C-shaped metal component in this construction having tabs inserted into slots in side rail 22 as best shown in FIGS. 2 and 3. An opening 24, FIGS. 1-3, is defined in the upper edge of rail 22 to allow flexure plate 14 to be freely suspended by bracket 16 in a vertically compact manner.

The ends of the shafts of the non-weighing idlers are typically rigidly secured to the side plates by way of bolts passing through holes in the side plates and threaded into tapped holes on the center-line of the shafts. A fastener 26, FIGS. 2 and 3, passes through a mounting feature of flexure plate 14 to engage an end of a shaft 28 within a weigh idler 30. An outer roller 32 of weigh idler 30 is freely rotatable about shaft 28 in this construction to support a conveyor belt 38, FIGS. 1 and 3, with minimal friction as it travels in the direction of arrow 39, also referred to as the longitudinal direction of belt 38. In other constructions, weigh idler 30 is a stationary member such as a bar or tube. In this construction, additional non-weighing idlers 40 and 42 are secured to rail 22 by fasteners 44 and 46 to also support the conveyor belt 38, and spacer rods 50 and 52 are similarly secured by fasteners 54 and 56.

Objects 60 and 62, FIG. 3, such as potato chips, crackers, or other food items are shown on belt 38 passing over weigh idler 30. Their weight is sensed by load sensing assemblies 12 and 12a as described in more detail below.

Figure 7:
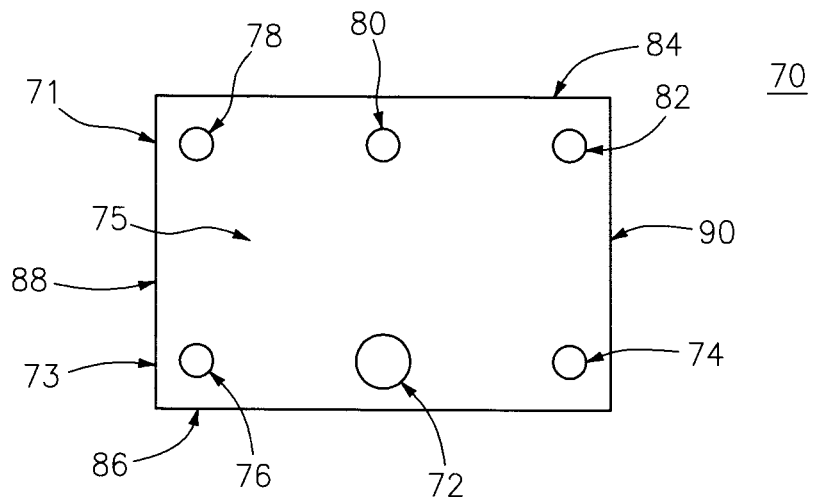
FIG. 7 is a side view of the flexure plate of FIG. 1.

As best shown in FIG. 7, flexure plate 14 has a metal sheet 70 with an upper region 71 defining fastener holes 78, 80 and 82, a lower region 73 defining a mount hole 72 between fastener holes 74 and 76, and a flex region 75 disposed between upper region 71 and lower region 75. Sheet 70 is bounded by an upper longitudinal edge 84, a lower longitudinal edge 86, and side edges 88 and 90. Referring to FIGS. 1-3 and 4-7, a stiffener 100 formed of bar members 102 and 104 in this construction define a mounting feature 106 together with hole 72 in plate 70 to accept fastener 26 which engages stationary shaft 28 of weigh idler 30. Bar member 102 defines holes 72', 74' and 76' which are aligned with holes 72, 74 and 76, respectively, of flexure plate 70 and with corresponding holes in bar member 104. Fasteners 107 and 109 pass through holes 74", 74, 74' and holes 76", 76, 76', respectively.

In this construction, flexure plate 14 is secured to a substantially non-yielding "Z-type" bracket 16 by an upper bar member 108 defining holes 78', 80' and 82' which are aligned with corresponding holes in flexure plate 70, block 110 and angle bracket 112 of bracket 16. For example, angle bracket 112 defines holes 78", 80" and 82" to accept fasteners 118, 120 and 122, respectively. In other words, block 110 and bar member 108 form an upper, vise-like longitudinal clamp on sheet 70 while bar members 102 and 104 form a lower, movable longitudinal clamp on sheet 70, with flex region 75 being the active, resilient, deflectable portion of sheet 70. The two longitudinal clamps preferably are parallel to each other to create a stable and repeatable "hinging" action in the flex region between the clamps of the upper and lower regions. The distance between the two longitudinal clamps can be varied depending on the material with which the flexure plate is constructed and its thickness.

It is currently preferred that the lengths of the upper and lower regions are greater than the width of the flex region. In one construction, sheet 70 is formed of food grade stainless spring steel and is approximately three inches in length, two inches in overall width, and has a thickness between 0.005 inch to 0.020 inch, with holes ranging from 7/32 inch to 13/32 inch.

The material comprising at least the at least one flex region of a flexure plate according to the present invention preferably exhibits spring-like resilience without permanent distortion during normal operating conditions of the load sensing system. Various materials can be utilized for the flexure plates. Suitable metal alloys include tempered stainless steel including T-301 food grade stainless steel formed of a chromium-nickel alloy, blue tempered carbon steel, and Ni-Span C alloy. Suitable polymeric materials, especially for measuring lighter loads, include polyvinyl chloride acetate (PVCA) and laminated Mylar (BoPET) bi-axially oriented polyethylene terephthalate film. For certain light-load applications, fabrics made of materials such as rayon and nylon may be utilized if the distance between the upper and lower regions is sufficiently narrow to achieve a hinging-type action. However, preferred materials behave in the flex region as a cantilevered flat spring by deflecting at its free end under load, typically both a lateral displacement and an angular displacement as the end of the bridging shaft moves both laterally and angularly in response to relative tilting between the shaft and the load cell, and restoring itself to its initial flat condition upon removal of the load.

Bracket 16 is rigidly connected to load cell 18 by fasteners 130 and 132 which pass through holes 134 and 136, defined by angle bracket 112, and into holes 140 and 142 defined in force transmission surface 144 of load cell 18. A support surface 148 of load cell 18 has holes which receive threaded ends of bolts 154 and 156 passing though holes 150 and 152 in shelf 20. In one construction, the load cell 18 is a single point load cell such as Model 1130 available from Vishay Tedea-Huntleigh. Preferably, load cell 18 is mounted so that the free ends of the cantilevered beams, relative to support surface 148, extend in the direction of conveyor belt travel as best illustrated in FIG. 1.

Figure 3A:
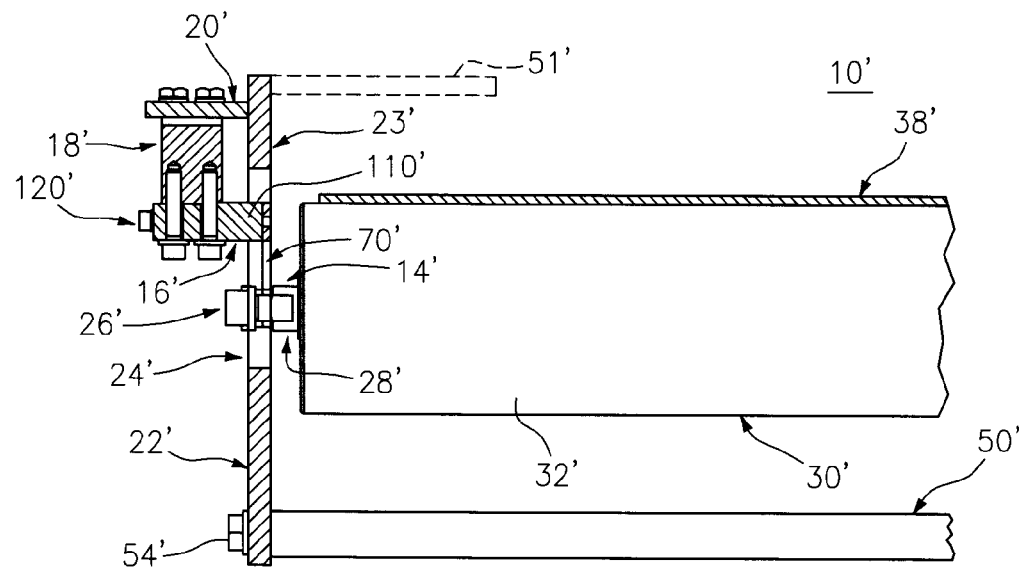
FIGS. 3A and 3B are views similar to FIG. 3 of alternative load sensing assemblies.

Force transmission surface 144, FIG. 2, receives compressive forces through bracket 16 in system 10. An alternative system 10', FIG. 3A, has a bracket 16' which places load cell 18' in tension as objects pass over conveyor belt 38' by transmitting forces on roller 32' and shaft 28' of weigh idler 30' via fastener 26' and sheet 70' of flexure plate 14'. In this construction, bracket 16' consists essentially of a block 110' and fastener 120'. Load cell 18' has a greater height than does load cell 18 in system 10. An extension 23' is connected to rail 22' without obstructing opening 24' in which flexure plate 14' is suspended. Support shelf 20' suspends load cell 18'. A portion of an optional support member 51' is shown in phantom. Other elements of system 10' that are similar to elements of system 10 are given similar reference numbers with prime marks.

Figure 3B:
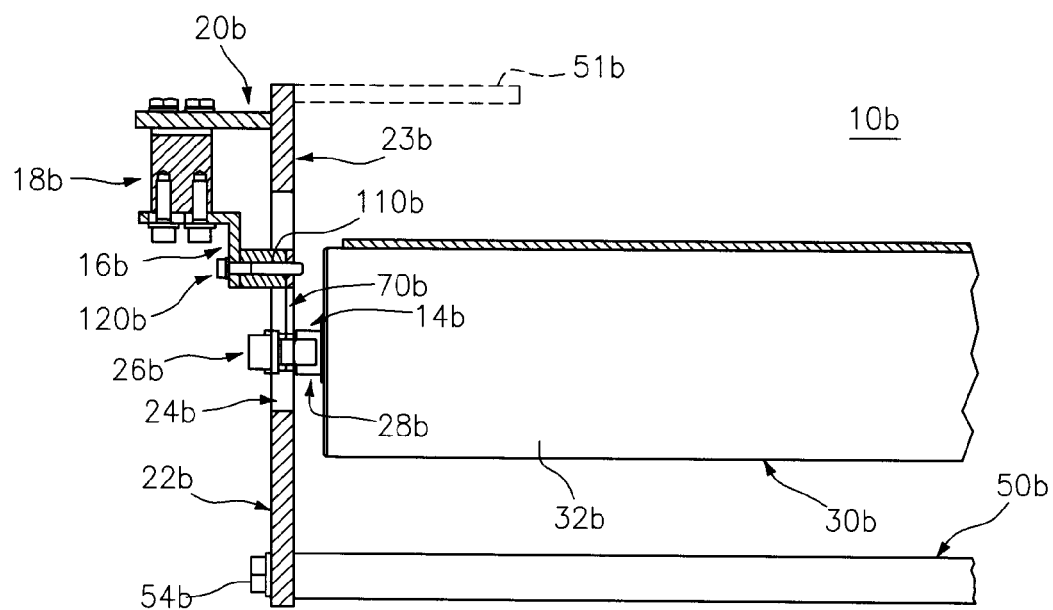
Figure 4:
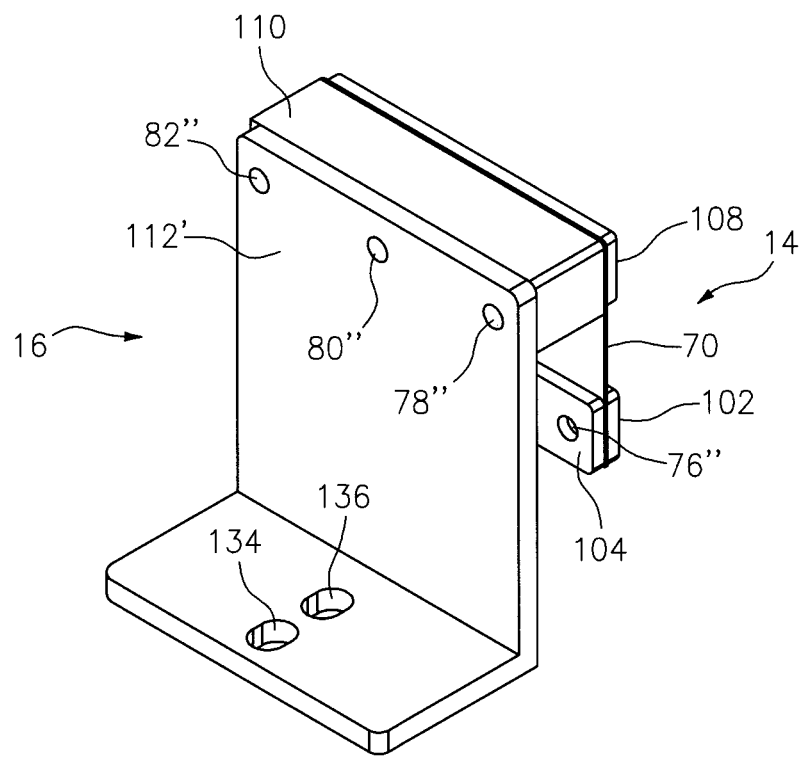
FIG. 4 is an outer, side perspective view of one of the brackets and flexure plates of FIG. 1.
Figure 5:
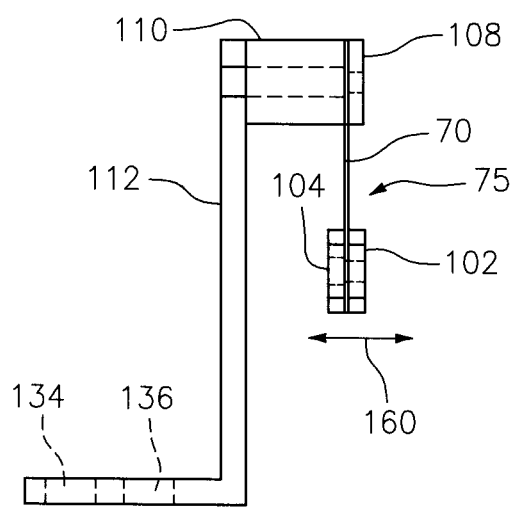
FIG. 5 is an end view of FIG. 5.
Figure 6:
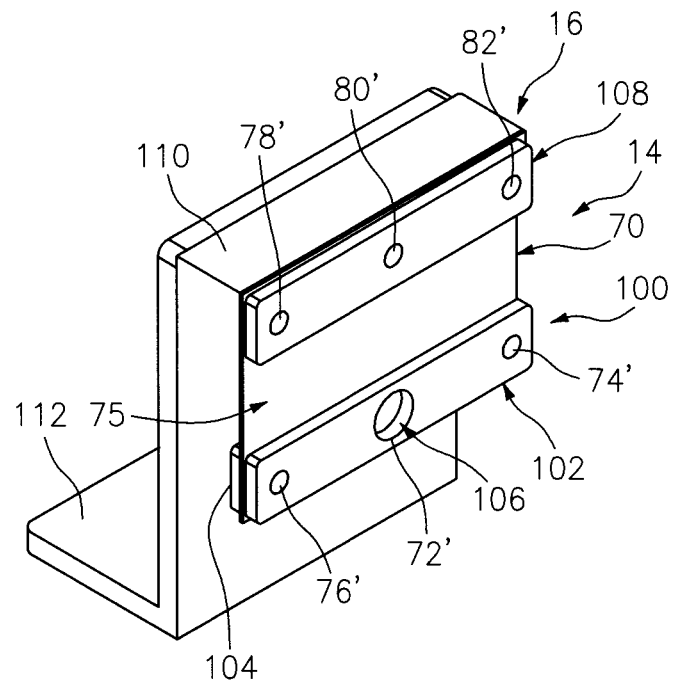
FIG. 6 is an inner perspective view of FIG. 5.

Yet another system 10b, FIG. 3B, has a bracket 16b which places load cell 18b in tension as objects pass over conveyor belt 38b by transmitting forces on roller 32b and shaft 28b of weigh idler 30b via fastener 26b and sheet 70b of flexure plate 14b. It is preferred that the vertical length of the attached inverted angle of bracket 16b be as short as possible to secure the block 110b to reduce undesirable moment created by drag forces across the weigh idler 30b. An extension 23b is connected to rail 22b without obstructing opening 24b in which flexure plate 14b is suspended. Support shelf 20b suspends load cell 18b. A portion of an optional support member 51b is shown in phantom. Other elements of system 10b that are similar to elements of system 10 are given similar reference numbers. In yet another embodiments, the bracket and flexure plate are formed monolithically with the one or more flex regions milled, cast, or otherwise formed (such as by 3D printing) to deflect under load as described in more detail regarding FIGS. 8-9A below.

In general, each flexure plate preferably is oriented in a load sensing assembly according to the present invention such that its plane surface lies normal, that is, perpendicular, to the axis of the shaft of the weigh idler, thereby being non-yieldable to both vertical and horizontal forces that are perpendicular to the shaft. However, each flexure plate is yieldable to lateral forces and bending moments, such as indicated by arrow 160, FIG. 5, that would otherwise be generated at the load cell junctions if load cells were directly bolted to the ends of the shaft. Force reactions on the flexure plates are transmitted through the brackets to the load cells while minimizing or eliminating the deleterious effects that the load cells would experience if they were directly connected to the shaft. Utilizing flexure plates according to the present invention maintains substantially constant sensitivity to load position along the length of the weigh idler, that is, across the width of a conveyor belt passing over the weigh idler as illustrated in FIG. 3 for snack items 60 and 62.

It has been observed by the present inventors that when rigidly securing a bridge member of short to moderate length L directly between two cantilevered beam load cells at either end, such that the beams of the load cell extend perpendicularly to the bridge and parallel to each other, that the summed output of the two load cells does not remain insensitive to the location of load application along the length of the bridge, even if each load cell by itself has been adjusted to provide the same output sensitivity. However, if a bridge member is supported on only one such load cell that provides support at its center, the load cell does exhibit insensitivity to the location of the load.

Another observation is that the bridge member resting on the centrally located single load cell tilts away from horizontal the further the load is placed from the load cell. However, when the bridge member is supported at its ends by two load cells, the amount of tilting is restrained as would be expected, the angle of tilt being determined by the difference in load cell deflections and the length of the bridge member between.

Since single point-type load cells are structurally configured and electrically compensated to take into account the normal deflections, that is, strains, that occur as a load is moved to various locations on a weigh deck, it should be apparent that any additional structure that is connected to the weigh deck that interferes with these normal deflections would in turn adversely affect the compensation.

Surmising that the degree of tilting of the bridge member when two load cells are rigidly attached may explain the noted sensitivity to load position led to additional experiments which have shown that improved insensitivity to load position can be achieved by adding a limited degree of freedom to the tilting movement of the bridge member.

As a result of this tilting action two conditions arise. The first being that the horizontal distance L between the two bridge end-points tends to shorten by the amount:

$$L*(1-\cos(\text{tilt angle}))$$

creating an unwanted side force on the load cells. The second condition results in a moment being applied to load cells caused by the tilting of the bridge member under off-center loads.

By using a thin flat flexure plate in series with the load transmission path to each load cell, and orienting the plate so that the bridge member is free to move a small amount laterally while accommodating the tilting of the bridge without subjecting the load cell to a bending moment, the desired insensitivity to vertical load placement can be readily achieved according to the present invention.

The moment-generating effect of drag forces across a weighing idler, also referred to as a bridge member, is especially minimized by the selection of a freely rotatable weighing idler. Since the flexure plates according to the present invention are oriented such that they are non-yieldable in the direction of these drag forces, any forward displacement of the idler toward the direction the belt is moving is constrained by the non-yieldability of the load cell in that direction.

Other flexure plates according to the present invention have at least two flex regions, such as flex regions 210 and 212 of flex plate 200, shown in exterior side view in FIG. 8 and in edge view in FIG. 8A with attachment block 204, which is part of a bracket as described above for other constructions. In this construction, flex plate 200 is formed as a monolith with subsequently thinned portions or webs, such as by milling away material, to establish flex regions 210 and 212 as "living hinges" separating thicker upper region 230, middle region 232 and lower region 234. In some constructions, block 204 is also formed as a portion of the monolith. In this construction, block member 204 defines holes 220, 222 and 224, with corresponding holes defined in the upper region 230 of flexure plate 200. A mounting hole 240 is defined in lower region 234.

By having at least two flex regions, the flexure plate 200 can readily accommodate both lateral and angular motions at the ends of a shaft. Yet other flexure plates are achieved by clamping bars or other rigid items to one or both sides of a flat plate or sheet, leaving gaps where the hinging action is to occur. Flexure plate 300, FIGS. 9 and 9A, has a sheet 306 with bar 308 forming upper region 330 in combination with attachment block 304, which defines holes 320, 322 and 324. Center bars 311 and 313, secured by fasteners 350, 352 and 354, form stiff middle region 332 while lower bars 315 and 317 form lower region 334 with fastening holes 342 and 344 and mounting hole 340.

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A load sensing system comprising at least one load sensing assembly, each assembly including:
   a flexure plate having an upper region extending along a longitudinal length of the flexure plate, a lower region disposed below the upper region, and at least one flex region disposed between the upper region and the lower region, the lower region defining a mounting feature for an end of a weigh idler, the lower region capable of substantially only lateral movement relative to the upper region;
   a load cell having a support surface and a force transmission surface; and
   a bracket having a first end rigidly connected to the force transmission surface of the load cell and having a second end rigidly connected at a plurality of areas to the upper region of the flexure plate to rigidly capture the upper region while suspending the remainder of the flexure plate to enable substantially only lateral movement of the lower region of the flexure plate during deflection of the flex region.

2. The system of claim 1 wherein the flexure plate includes a substantially planar sheet of material having spring-like resiliency in at least the at least one flex region.

3. The system of claim 2 wherein the material includes a metal alloy.

4. The system of claim 1 wherein the lower region of the flexure plate includes a substantially rigid stiffener extending longitudinally along the lower region.

5. The system of claim 4 wherein the mounting feature is defined at least in part by a portion of the stiffener.

6. The system of claim 1 wherein the load cell is a single point-type load cell.

7. The system of claim 1 further including the weigh idler, the weigh idler including a shaft having first and second ends, with one of the first and second ends connected to the mounting feature of the flexure plate.

8. The system of claim 7 wherein the weigh idler is freely rotatable about the shaft.

9. A load sensing system comprising:
   a weigh idler including a shaft having first and second ends;
   first and second load sensing assemblies, each load sensing assembly including: (1) a flexure plate having an upper region extending along a longitudinal length of the flexure plate, a lower region disposed below the upper region, and at least one flex region disposed between the upper region and the lower region, the lower region defining a mounting feature for one of the first and second ends of the weigh idler, the lower region capable of substantially only lateral movement relative to the upper region, (2) a load cell having a support surface and a force transmission surface; and (3) a bracket having a first end rigidly connected to the force transmission surface of the load cell and having a second end rigidly connected at a plurality of areas to the upper region of the flexure plate to rigidly capture the upper region while suspending the remainder of the flexure plate to enable substantially only lateral movement of the lower region of the flexure plate during flexure of the flex region;
   wherein the weigh idler is supported entirely by the flexure plates of the first and second load sensing assemblies.

10. The system of claim 9 wherein each flexure plate includes a substantially planar sheet of material having spring-like resiliency in at least the at least one flex region.

11. The system of claim 10 wherein the lower region of each flexure plate includes a substantially rigid stiffener extending longitudinally along the lower region.

12. The system of claim 11 wherein each stiffener includes at least one substantially rigid bar member.

13. The system of claim 11 wherein the material includes a metal alloy and the mounting feature is defined at least in part by a portion of the stiffener.

14. The system of claim 9 wherein the weigh idler is freely rotatable about the shaft.

15. The system of claim 9 wherein each load cell is a single point-type load cell.

16. The system of claim 15 wherein the cantilevered beams of the load cells are arranged substantially parallel to each other and substantially perpendicular to the weigh idler.

17. A method of weighing objects on a conveyor belt, comprising:
   selecting a weigh idler including a shaft having first and second ends;
   selecting first and second load sensing assemblies, each load sensing assembly including: (1) a flexure plate having an upper region extending along a longitudinal length of the flexure plate, a lower region disposed below the upper region, and at least one flex region disposed between the upper region and the lower region, the lower region defining a mounting feature for one of the first and second ends of the weigh idler, the lower region capable of substantially only lateral movement relative to the upper region, (2) a load cell having a support surface and a force transmission surface; and (3) a bracket having a first end rigidly connected to the force transmission surface of the load cell and having a second end rigidly connected at a plurality of areas to the upper region of the flexure plate to rigidly capture the upper region while suspending the remainder of the flexure plate to enable substantially only lateral movement of the lower region of the flexure plate during deflection of the flex region;
   supporting the weigh idler entirely by the flexure plates of the first and second load sensing assemblies; and sensing the weight of objects on a conveyor belt passing over the weigh idler.

18. The method of claim 17 wherein the weigh idler is freely rotatable about the shaft.

19. The method of claim 17 wherein each load cell is a single point-type load cell having at least two cantilevered beams, and the cantilevered beams of the load cells are arranged substantially parallel to each other and substantially perpendicular to the weigh idler.

* * * * *